United States Patent
Kawauchi et al.

(10) Patent No.: US 7,541,394 B2
(45) Date of Patent: Jun. 2, 2009

(54) WATER BASE PIGMENT INK COMPOSITION FOR INNER LEAD TYPE WRITING INSTRUMENT

(75) Inventors: Kazuhiro Kawauchi, Osaka (JP); Takeshi Omatsu, Osaka (JP)

(73) Assignee: Sakura Color Products Corporation, Osaka-shi (JP)

(*) Notice: Subject to any disclaimer, the term of this patent is extended or adjusted under 35 U.S.C. 154(b) by 557 days.

(21) Appl. No.: 10/541,932

(22) PCT Filed: Dec. 26, 2003

(86) PCT No.: PCT/JP03/16904

§ 371 (c)(1), (2), (4) Date: Oct. 7, 2005

(87) PCT Pub. No.: WO2004/063297

PCT Pub. Date: Jul. 29, 2004

(65) Prior Publication Data

US 2006/0142418 A1    Jun. 29, 2006

(30) Foreign Application Priority Data

Jan. 10, 2003  (JP) .............................. 2003-003904

(51) Int. Cl.
*C09D 11/00* (2006.01)
(52) U.S. Cl. ...................... 523/160; 523/161
(58) Field of Classification Search .................. 523/160, 523/161
See application file for complete search history.

(56) References Cited

U.S. PATENT DOCUMENTS

2001/0032567 A1  10/2001  Ikoma

FOREIGN PATENT DOCUMENTS

| JP | 8-9703 | 1/1996 |
|---|---|---|
| JP | 8-9704 | 1/1996 |
| JP | 63-97670 | 4/1998 |
| JP | 11-241042 | 9/1999 |
| JP | 11-241042 A | 9/1999 |
| JP | 2000-129189 | 5/2000 |
| JP | 2000-129189 A | 5/2000 |
| JP | 2001-271020 A | 10/2001 |
| JP | 2002-53788 | 2/2002 |
| JP | 2002-53788 A | 2/2002 |

OTHER PUBLICATIONS

Notification of Reasons for Refusal issued by the Japanese Patent Office in co-pending Japanese Application No. 2003-426222 on Dec. 13, 2007.

*Primary Examiner*—Edward J Cain
(74) *Attorney, Agent, or Firm*—Hamre, Schumann, Mueller & Larson, P.C.

(57) ABSTRACT

A water base pigment ink composition for inner lead type writing instruments do not comprise white colored inorganic pigments or white colored resin particles as coloring materials and the content of pigment is 0.5 to 7 wt %, the content of water-soluble resin is 2 to 10 wt % with respect to the total amount of the ink, and the viscosity is 3.5 to 10 mPa·s.

2 Claims, No Drawings

WATER BASE PIGMENT INK COMPOSITION FOR INNER LEAD TYPE WRITING INSTRUMENT

BACKGROUND OF THE INVENTION

Field of the Invention

The present invention relates to a water base pigment ink composition for inner lead type writing instruments. More specifically, the present invention relates to a water base pigment ink composition for inner lead type writing instruments in which written marks have pastel tones on white paper and which is free from such trouble as ink leakage, shading of written marks, and the like.

Conventionally, as a pastel toned water base pigment ink composition for writing instruments, disclosures in Japanese Patent Kokoku publication No. 08-009703 (Patent document 1) and Japanese Patent Kokoku publication No. 08-009704 (Patent document 2) are publicly known. Such a pastel toned water base pigment ink composition for writing instruments uses white colored inorganic pigments such as titanium dioxide or white colored resin particles in order to develop pastel tones (to make written marks opaque).

However, in said conventional pastel toned water base pigment ink composition for writing instruments, when used for inner lead type writing instruments, dispersion stability with time within an inner lead was low and ink dischargeability from a pen tip was not good since said white colored inorganic pigments or white resin particles settle out.

Therefore, the object of the present invention is to provide a water base pigment ink composition for writing instruments capable of overcoming drawbacks of poor dispersion stability with time and ink dischargeability and with pastel toned written marks.

SUMMARY OF THE INVENTION

The present invention relates to a water base pigment ink composition for inner lead type writing instruments comprising no white colored inorganic pigments or white colored resin particles as coloring materials, wherein pigments are contained in 0.5 to 7 wt %, water soluble resin is contained in 2 to 10 wt %, and viscosity is 3.5 to 10 mPa·s. By this composition, when such an ink is contained in a inner lead of writing instruments, pastel toned written marks can be obtained, and at the same time, ink droplet does not occur at a pen tip and there is an effect that dispersion stability of the ink within an inner lead is good.

In addition, the viscosity in the present invention is measured using an ELD viscometer 3° 14' cone rotor with a rotation speed of 50 rpm at a temperature of 20° C.

Further, by preparing a water base pigment ink composition for inner lead type writing instruments as set forth in claim 1, in which pigments other than said white colored inorganic pigments or said white colored resin particles are selected one or more species from quinacridone red, DPP red, phthalocyanine blue, phthalocyanine green, azo yellow, and disazo yellow, an effect of good light resistance can be obtained. Further, by preparing a water base pigment ink composition for inner lead type writing instruments as set forth in claim 1 or 2, in which said water soluble resins are selected one or more species from acrylic acid resins, styrene-acrylic acid resins, and styrene-maleic acid resins, the inventors have found the effects of improved dispersion stability.

In other words, in a water base pigment ink composition for inner lead type writing instruments, by not including white colored inorganic pigments or white colored resin particles as coloring materials and by setting the content of pigments other than white colored inorganic pigments or said white colored resin particles 0.5 to 7 wt % with respect to the total ink, pastel tone can be obtained. However, when water soluble resins are contained in less than 2 wt %, the ink viscosity becomes around 2mPa·s, leaving a problem of ink droplet and poor dispersion stability. Thus, by increasing the content of said water soluble resins to 2 to 10 wt % compared with conventional content and by adjusting ink viscosity to 3.5 to 10 mPa·s, the above mentioned problem has been solved.

Further, in the present invention, it is preferable to include at least one species selected from quinacridone red, DPP red, phthalocyanine blue, phthalocyanine green, azo yellow, and disazo yellow as coloring materials.

Particularly, in the present invention, it is preferable to include at least one species selected from quinacridone red, DPP red, phthalocyanine blue, phthalocyanine green, azo yellow, and disazo yellow as coloring materials in at least 0.1 to 7 wt % with respect to the total amount of the composition. Further, it is preferable that water soluble resins are selected one or more species selected from acrylic acid resins, styrene-acrylic acid resins, and styrene-maleic acid resins.

DESCRIPTION OF THE PREFERRED EMBODIMENT

A water base pigment ink composition for inner lead type writing instruments of the present invention comprises no white colored inorganic pigments or white colored resin particles as coloring materials, wherein pigments other than white colored inorganic pigments or white colored resin particles are contained in 0.5 to 7 wt %, water soluble resin is contained in 2 to 10 wt %, and the viscosity is 3.5 to 10 mPa·s, and by preparing such a composition, dispersion stability with time and pastel tone can be obtained.

As coloring materials used in the present invention, general organic pigments can be used and as azo pigments, such pigments as mono azo pigments (β-naphthol series, naphthol AS series, acetoacetic arylamide series, pyrazolone acetoacetic arylamide series, acetoacetanilide series, hanzayellow series, fast yellow series), disazo series (except condensation azo pigments) (acetoacetic arylamide series, pyrazolone series), azo rake (soluble azo pigments) (β-naphthol series, β-oxynaphthoic acid series) (BON acid series), naphthol AS series, acetoacetic allylide series), further, condensation azo pigments, chelate azo pigments, and as polycyclic pigments, such pigments as phthalocyanine series, anthraquinone series (surene series)(vat dye series, chelate series), perylene series, perynon series, indigo series, thioindigo series, quinacridone series, dioxadine series, isoindolinone series, quinophthalone series, metal complex pigments (nitro-type Ni complex, azomethine-type Cu complex, azo-type Ni complex) methine * azomethine can be used and in view of light resistance, pigments such as quinacridone red, DPP red, phthalocyanine blue, phthalocyanine green, azo yellow, and disazo yellow are preferable. In addition, these coloring materials can be used alone or in combinations of two or more of them.

These pigments can be contained in 0.5 to 7 wt %, and preferably, in 1 to 5 wt %. When these pigments are contained in less than 0.5 wt %, written marks get thin, and when these pigments are contained greater than 7 wt %, pastel colored tone cannot be obtained. In addition, when at least one species is used among quinacridone red, DPP red, phthalocyanine blue, phthalocyanine green, azo yellow, and disazo yellow, pigments other than these may be used together, however, in such cases, quinacridone red, DPP red, phthalocyanine blue, phthalocyanine green, azo yellow, and disazo yellow can preferably be used in an amount of 0.1 to 7 wt % from the view point of light resistance and writing characteristics. More preferable content range is 1 to 5 wt %.

As water-soluble resins used in the present invention, water-soluble resins used for aqueous writing instruments can be used and specifically, acrylic resins, styrene-acrylic resins, styrene-maleic resins and the like are exemplified. The content of water-soluble resin can be 2 to 10 wt % with respect to the total amount of the composition and preferably, 2 to 5 wt %. When the content is less than 2 wt %, viscosity lowers and cause ink droplet or dispersion stability deteriorates. On the other hand, when the content exceeds 10 wt %, viscosity becomes so high that ink dischargeability deteriorates.

As solvents, water is used. The content is usually 40 to 60 wt %. When the content of water is less than 40 wt %, ink viscosity becomes so high that ink dischargeability deteriorates. On the other hand, when the content exceeds 60 wt %, written marks get hard to dry.

In the present invention, water-soluble organic solvents can be used as wetting agents. When water-soluble organic solvents are used, as such water-soluble organic solvents, glycerin, ethylene glycol, diethylene glycol, propylene glycol, and the like can be used. The content of these water-soluble organic solvents is preferably 10 to 30 wt %. When the content is less than 10 wt %, wetting effect is not satisfactory and thin spots appear in written marks, and on the other hand, when the content exceeds 30 wt %, written marks get hard to dry and water resistance weakens.

Further, the present invention, surfactants may be used. As surfactants, anionic surfactants (carboxylic acid-type, sulfuric ester-type, sulfone-type, phosphoric ester-type), nonionic surfactants (ether-type, ester-type, amino ether-type, alkyl amide-type), and as for others, fluorinated-type surfactants, silicone-type surfactants, and reactivity surfactants can be used. There surfactants can be used alone or in combinations of two or more of them. The content of these surfactants is preferably not greater than 5 wt %, and further preferably, 0.05 to 3 wt %. When the content exceeds 5 wt %, dispersion stability of ink compositions is inhibited.

Further, for the purpose of improving cap-off performance (prevention of dried pen tips), urea and derivatives thereof, sugar and sugar ester and the like may be added.

Further, as required, pH regulators, anti-rusting agents, antiseptic mildew-proofing agents, and the like can be appropriately used. As pH regulators, caustic soda, ammonium, and the like can be used. As anti-rusting agents and antiseptic mildew-proofing agents, publicly known ones can be used.

Ink viscosity is required to be set in the range of 3.5 to 10 mPa·s. When said viscosity is less than 3.5 mPa·s, pigment dispersion stability deteriorates and such problems occur such as ink droplets, shading in written marks, ink leakage, and the like. On the other hand, when said viscosity exceeds 10 mPa·s, ink dischargeability deteriorates. Methods of regulating ink viscosity include adjusting the content of pigments, water-soluble resins, water-soluble organic solvents and also, adjusting viscosity by using additives such as surfactants and the like.

Hereinafter, the present invention is further explained in more detail. For information, the protection range of the present invention is not limited to thee range of these Examples. In addition, ink viscosity in Examples and Comparative Examples was measured by using an ELD viscometer. Ink viscosity was measured under the condition of using a 3° 14' cone rotor, with a rotational speed of 50 rpm at a temperature of 20° C. as mentioned above.

EXAMPLES

Example 1

Inks with compositions shown in Table 1 were prepared respectively.

First, 25 parts by weight of azo yellow pigments, 20 parts by weight of ethylene glycol, 2 parts by weight of butylceilsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt % with respect to the total amount of the aqueous pigment dispersion A, thereby obtaining aqueous pigment dispersion A.

Next, to this water base pigment dispersion A, with the content shown in Table 1, 27 parts by weight of glycerin, 10 parts by weight of urea, 28.8 parts by weight of water, 0.1 parts by weight of COATSIDE H (manufactured by Takeda Pharmaceutical company limited), 0.1 parts by weight of PROXEL XL-2 (manufactured by Avecia K.K.) as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Example 2

Inks with compositions shown in Table 1 were prepared respectively.

First, 25 parts by weight of quinacridone red pigments, 20 parts by weight of ethylene glycol, 2 parts by weight of butylcellsolve, and 28 parts by weight of water were added to 25 parts by weight of water-soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining water base pigment dispersion B.

Next, to this water base pigment dispersion B, with the content shown in Table 1, 28 parts by weight of glycerin, 10 parts by weight of urea, 41.5 parts by weight of water, 0.1 parts by weight of COATSIDE H, 0.1 parts by weight of PROXEL XL-2 and 15 parts by weight of said water-soluble resin liquid (20 wt % of styrene-acrylic acid resin, 2 wt % of caustic soda, and 78 wt % of water) were added, thereby obtaining a water base pigment ink.

Example 3

Inks with compositions shown in Table 1 were prepared respectively.

First, 25 parts by weight of DPP red pigments, 20 parts by weight of ethylene glycol, 2 parts by weight of butylceilsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further. adding 32 parts by weight of water so that pigments concentration gets 17 wt %, thereby obtaining water base pigment dispersion C.

Next, to this water base pigment dispersion C, with the content shown in Table 1, 25 parts by weight of glycerin, 10 parts by weight of urea, 41.0 parts by weight of water, 0.1 parts by weight of COATSIDE H, 0.1 parts by weight of PROXEL XL-2 and 15 parts by weight of said water-soluble resin liquid (20 wt % of styrene-acrylic acid resin, 2 wt % of caustic soda, and 78 wt % of water) were added, thereby obtaining a water base pigment ink.

Example 4

Inks with compositions shown in Table 1 were prepared respectively.

First, 25 parts by weight of phthalocyanine green pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining water base pigment dispersion D.

Next, to this water base pigment dispersion D, with the content shown in Table 1, 25 parts by weight of glycerin, 10 parts by weight of urea, 41.7 parts by weight of water, 0.1 parts by weight of COATSIDE H, 0.1 parts by weight of PROXEL XL-2 and 15 parts by weight of said water-soluble resin liquid (20 wt % of styrene-acrylic acid resin, 2 wt % of caustic soda, and 78 wt % of water) were added, thereby obtaining a water base pigment ink.

Example 5

Inks with compositions shown in Table 1 were prepared respectively.

First, 25 parts by weight of phthalocyanine blue pigments, 20 parts by weight of ethylene glycol, 2 parts by weight of butylceilsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining water base pigment dispersion E.

Next, to this water base pigment dispersion E, with the content shown in Table 1, 28 parts by weight of glycerin, 10 parts by weight of urea, 43.0 parts by weight of water, 0.1 parts by weight of COATSIDE H, 0.1 parts by weight of PROXEL XL-2 and 15 parts by weight of said water-soluble resin liquid (20 wt % of styrene-acrylic acid resin, 2 wt % of caustic soda, and 78 wt % of water) were added, thereby obtaining a water base pigment ink.

Comparative Example 1

Inks with compositions shown in Table 1 were prepared respectively.

First, 25 parts by weight of azo yellow pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion A.

Next, to 29 parts by weight of this water base pigment dispersion A, 3.0 parts by weight of titanium dioxide dispersion, 27 parts by weight of glycerin, 10 parts by weight of urea, 28.8 parts by weight of water, 0.1 parts by weight of COATSIDE H (manufactured by Takeda Pharmaceutical company limited), 0.1 parts by weight of PROXEL XL-2 (manufactured by Avecia K.K.) as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Comparative Example 2

Inks with compositions shown in Table 1 were prepared respectively.

First, 25 parts by weight of azo yellow pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion A.

Next, to this water base pigment dispersion A, 27 parts by weight of glycerin, 10 parts by weight of urea, 33.8 parts by weight of water, 0.1 parts by weight of COATSIDE H, 0.1 parts by weight of PROXEL XL-2 as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Comparative Example 3

Inks with compositions shown in Table 1 were prepared respectively.

First, 25 parts by weight of quinacridone red pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion B.

Next, to this water base pigment dispersion B, 28 parts by weight of glycerin, 10 parts by weight of urea, 56.5 parts by weight of water, 0.1 parts by weight of COATSIDE H, 0.1 parts by weight of PROXEL XL-2 as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Comparative Example 4

Inks with compositions shown in Table 1 were prepared respectively.

First, 25 parts by weight of DPP red pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion C.

Next, to this water base pigment dispersion C, 25 parts by weight of glycerin, 10 parts by weight of urea, 56.0 parts by weight of water, 0.1 parts by weight of COATSIDE H, 0.1 parts by weight of PROXEL XL-2 as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Comparative Example 5

Inks with compositions shown in Table 1 were prepared respectively.

First, 25 parts by weight of phthalocyanine green pigments, 20 parts by weight of ethylene glycol, 2 parts by weight of butylcellsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion E.

Next, to this water base pigment dispersion D, 25 parts by weight of glycerin, 10 parts by weight of urea, 56.7 parts by weight of water, 0.1 parts by weight of COATSIDE H, 0.1 parts by weight of PROXEL XL-2 as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

Comparative Example 6

Inks with compositions shown in Table 1 were prepared respectively.

First, 25 parts by weight of phthalocyanine blue pigments, 20 parts by weight of ethylene glycol, 2 parts by weight of butylceilsolve, and 28 parts by weight of water were added to 25 parts by weight of water soluble resin liquid (20 wt % of styrene-acrylic acid resin, 2 wt % of caustic soda, and 78 wt % of water), followed by dispersing by a publicly known bead mill and further adding 32 parts by weight of water so that pigments concentration gets 17 wt %, thereby obtaining aqueous pigment dispersion E.

Next, to this water base pigment dispersion E, 28 parts by weight of 5 glycerin, 10 parts by weight of urea, 58.0 parts by weight of water, 0.1 parts by weight of COATSIDE H, 0.1 parts by weight of PROXEL XL-2 as antiseptic mildew-proofing agents, and 5 parts by weight of said water-soluble resin liquid (20 wt % of styrene-acrylic acid resin, 2 wt % of caustic soda, and 78 wt % of water) were added, thereby obtaining a water base pigment ink.

TABLE 1

(wt %)

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Pigment | Pigment dispersion A | 30.0 | | | | | 30.0 | 30.0 | | | | |
| | Pigment dispersion B | | 5.8 | | | | | | 5.8 | | | |
| | Pigment dispersion C | | | 8.8 | | | | | | 8.8 | | |
| | Pigment dispersion D | | | | 8.1 | | | | | | 8.1 | |
| | Pigment dispersion E | | | | | 3.8 | | | | | | 3.8 |
| | Titanium dioxide Dispersion[1] | | | | | | 3.0 | | | | | |
| | Pigment concentration[2] | 4.9 | 1.0 | 1.5 | 1.4 | 0.6 | 5.4 | 4.9 | 1.0 | 1.5 | 1.4 | 0.6 |
| | Water - soluble resin[3] | 1.0 | 0.2 | 0.3 | 0.3 | 0.1 | 1.1 | 1.0 | 0.2 | 0.3 | 0.3 | 0.1 |
| PROXEL XL-2 | | 0.1 | 0.1 | 0.1 | 0.1 | 0.1 | 0.1 | 0.1 | 0.1 | 0.1 | 0.1 | 0.1 |
| COATSIDE H | | 0.1 | 0.1 | 0.1 | 0.1 | 0.1 | 0.1 | 0.1 | 0.1 | 0.1 | 0.1 | 0.1 |
| Resin in aqueous solution (water soluble resin[4]) | | 5.0 (1.0) | 15.0 (3.0) | 15.0 (3.0) | 15.0 (3.0) | 15.0 (3.0) | 15.0 (3.0) | | | | | |
| Glycerin | | 27.0 | 28.0 | 25.0 | 25.0 | 28.0 | 27.0 | 27.0 | 28.0 | 25.0 | 25.0 | 28.0 |
| Water | | 27.8 | 41.0 | 41.0 | 41.0 | 41.7 | 43.0 | 24.8 | 32.8 | 56.0 | 56.0 | 58.0 |
| Urea | | 10.0 | 10.0 | 10.0 | 10.0 | 10.0 | 10.0 | 10.0 | 10.0 | 10.0 | 10.0 | 10.0 |
| Total (wt %) | | 100.0 | 100.0 | 100.0 | 100.0 | 100.0 | 100.0 | 100.0 | 100.0 | 100.0 | 100.0 | 100.0 |
| Total amount of water-soluble resin(wt %) | | 2.0 | 3.2 | 3.3 | 3.3 | 3.1 | 2.1 | 1.0 | 0.2 | 0.3 | 0.3 | 0.1 |
| Evaluation | | | | | | | | | | | | |
| Viscosity | | 5.8 | 4.5 | 4.3 | 4.2 | 4.3 | 6.0 | 4.9 | 3.2 | 3.0 | 2.9 | 3.0 |
| Concentration change in erected/inverted state writing[5] | | ◎ | ◎ | ◎ | ◎ | ◎ | X | Δ | X | X | X | X |

(Note)
[1] titanium dioxide dispersion: the dispersion is composed of 25 parts by weight of water-soluble resin, with 25 parts by weight of titanium dioxide, 20 parts by weight of ethylene glycol, 30 parts by weight of water added, followed by dispersing with a publicly known bead mill and adding 32 parts by weight of water so that concentration of titanium dioxide is 17 wt %. In addition, water-soluble resin liquid is composed of 20 wt % of styrene acryl acid resin, 2 wt % of caustic soda, and 78 wt % of water and water-soluble resin is a styrene acryl acid resin.
[2] pigment concentration: pigment concentration with respect to the total amount of the ink (wt %)
[3] water-soluble resin: styrene acrylic acid resin included in pigment dispersions A to E and concentration with respect to the total amount of the ink (wt %)
[4] water-soluble resin: styrene acrylic acid resin and concentration with respect to the total amount of the ink (wt %)
[5] handwriting on paper and the concentration (wt %) of written marks before and after storage visually observed
◎ shows no concentration change.
○ shows substantially no concentration change.
Δ shows clear concentration change.
X shows remarkable concentration change.

Pigment component as mentioned above shown in Examples and Comparative Examples are as follows:

(Pigments)

Quinacridone (trade name: Chromophthal Pink PT manufactured by Chiba Specialty Chemicals Co., Ltd.)

Phthalocyanine blue (trade name: Fastgen Blue TGR manufactured by DAINIPPON INK AND CHEMICALS INCORPORATED.)

Phthalocyanine green (trade name: Fastgen Green B manufactured by DAINIPPON INK AND CHEMICALS INCORPORATED.)

Azo yellow (trade name: Rheonol Yellow 10 GPT, manufactured by TOYO INK MFG. CO., LTD.)

DPP red (trade name: Chromophthal Red 2030 manufactured by Chiba Specialty Chemicals Co., Ltd.)

(Evaluation of Ink Compositions)

Water base ink compositions obtained in Examples 1 to 5 and Comparative Examples 1 to 5 were filled in inner lead type writing instruments and written marks were observed by writing on a paper sheet. Further, after writing, the writing instruments were left to stand under a temperature of 50° C. for one month in erected state (state in which a pen tip is directed upward) and in inverted state (state in which a pen tip is directed downward), respectively, followed by writing and concentration change was compared with an initial state. The result is shown in Table 1.

(Color Difference Between Writing Lines and White Paper)

Inks of Examples were written on white paper and color difference between the writing lines and white paper was evaluated. As a measurement device, a color-difference meter with a trade name "CR-241" manufactured by KONICA MINOLTA Co., Ltd. was used and color difference was measured based on JIS Z 8729 standard. As a result, while L* was 93.8, a* 0.6, and b* −1.1 in white paper, L* is not less than 68 in inks of each Example, and color difference $\Delta E$ *(ab) between white paper was not greater than 45. By this, inks in each Example were observed to have great degree of color development as pastel colors.

(Evaluation Result)

In water base ink compositions in Examples 1 to 5, pastel toned written marks were obtained and there was no concentration change in erected states and inverted states and in writing characteristics. On the other hand, although in water base ink compositions in Comparative Examples 1 to 5, although pastel toned written marks were obtained, concentration change in erected and inverted states as well as writing characteristics were remarkably bad.

As heretofore mentioned, a water base pigment ink composition for inner lead type writing instruments, by not using white colored pigments and by preparing specific content amount of pigments, by preparing specific content amount of water-soluble resin, and by setting specific ink viscosity, pastel-toned color can be obtained and when used for inner lead type writing instruments, dispersion stability of inks are obtained and effects of preventing ink droplets and color shadings due to erect states and inverted states of writing instruments. Further, ink leakage is not liable to occur from writing instrument containers.

INDUSTRIAL APPLICABILITY

Ink compositions of the present invention can be applied for inner lead type writing instruments provided with publicly known structures. For example, such writing instruments have inner leads in which fiber bundles as ink containers are bundled and have pen tips which discharge inks stored in inner leads, and as pen tips, for example, balls, fibers, plastic leads, brush-like materials, and pen-shaped materials are provided.

What is claimed is:

1. Inner lead type writing instruments comprising:
   inner leads in which fiber bundles are bundled as ink containers and
   pen tips that discharge inks contained in said inner leads and are composed of any one of fibers, plastic leads, brush-like materials and pen-shaped materials,
   wherein said inks do not comprise white colored inorganic pigments or white colored resin particles as coloring materials, and the content of pigments other than said white colored inorganic pigments or white colored resin particles is 0.5 to 7 wt %, the content of water-soluble resin is 2 to 10 wt % with respect to the total amount of the ink, and the viscosity is 3.5 to 10 mPa·s.

2. Inner lead type writing instruments comprising:
   inner leads in which fiber bundles are bundled as ink containers and
   pen tips that discharge inks contained in said inner leads and are composed of any one of fibers, plastic leads, brush-like materials and pen-shaped materials,
   wherein said inks do not comprise white colored inorganic pigments or white colored resin particles as coloring materials, pigments other than said white colored inorganic pigments or white colored resin particles are one or more species selected from quinacridone red, DPP red, phthalocyanine blue, phthalocyanine green, azo yellow, and disazo yellow, said water-soluble resins are one or more species selected from acrylic acid resins, styrene-acrylic acid resins, styrene-maleic acid resins, and the content of pigments other than said white colored inorganic pigments or white colored resin particles is 0.5 to 7 wt %, said water-soluble resin is 2 to 10 wt % with respect to the total amount of the ink, and the viscosity is 3.5 to 10 mPa·s.

* * * * *